(12) United States Patent
Fan et al.

(10) Patent No.: US 11,461,399 B2
(45) Date of Patent: Oct. 4, 2022

(54) METHOD AND APPARATUS FOR RESPONDING TO QUESTION, AND STORAGE MEDIUM

(71) Applicant: BAIDU ONLINE NETWORK TECHNOLOGY (BEIJING) CO., LTD., Beijing (CN)

(72) Inventors: Miao Fan, Beijing (CN); Chao Feng, Beijing (CN); Mingming Sun, Beijing (CN); Ping Li, Beijing (CN); Haifeng Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 443 days.

(21) Appl. No.: 16/706,218

(22) Filed: Dec. 6, 2019

(65) Prior Publication Data

US 2020/0183984 A1    Jun. 11, 2020

(30) Foreign Application Priority Data

Dec. 10, 2018   (CN) .......................... 201811506468.2

(51) Int. Cl.
*G06F 40/30*   (2020.01)
*G06F 16/9032*   (2019.01)

(52) U.S. Cl.
CPC ........ *G06F 16/90332* (2019.01); *G06F 40/30* (2020.01)

(58) Field of Classification Search
CPC ............. G06F 16/3329; G06F 16/3344; G06F 16/90332; G06F 40/30
See application file for complete search history.

(56) References Cited

U.S. PATENT DOCUMENTS

| | | | |
|---|---|---|---|
| 10,360,265 B1 * | 7/2019 | Agarwal | G06F 16/24522 |
| 2013/0124488 A1 * | 5/2013 | Kang | G06F 16/2458 707/693 |
| 2014/0136517 A1 * | 5/2014 | Li | G06F 16/345 707/E17.014 |
| 2014/0351228 A1 * | 11/2014 | Yamamoto | G06F 40/35 707/723 |
| 2015/0234924 A1 * | 8/2015 | Schydlowsky | H04L 67/10 707/738 |
| 2016/0260130 A1 * | 9/2016 | Chand | G06F 16/5854 |
| 2017/0249311 A1 * | 8/2017 | Pelleg | G06N 5/04 |
| 2018/0276525 A1 * | 9/2018 | Jiang | G06F 40/216 |
| 2018/0349560 A1 * | 12/2018 | McCloskey | G16H 10/60 |
| 2019/0079999 A1 * | 3/2019 | Min | G06N 3/0454 |
| 2019/0236136 A1 * | 8/2019 | Sigal | G06N 3/0445 |

* cited by examiner

*Primary Examiner* — Eric Yen
(74) *Attorney, Agent, or Firm* — Fay Sharpe LLP

(57) ABSTRACT

According to embodiments of the present disclosure, a method and an apparatus for responding to a question, and a storage medium are provided. The method includes: determining a question characteristic representation corresponding to a question for an object; determining a comment characteristic representation corresponding to a first comment for the object; generating a first target characteristic representation by utilizing the question characteristic representation and the comment characteristic representation; and determining an answer for the question based on the first target characteristic representation.

20 Claims, 4 Drawing Sheets

METHOD AND APPARATUS FOR RESPONDING TO QUESTION, AND STORAGE MEDIUM

CROSS-REFERENCE TO RELATED APPLICATION

The present application is based upon and claims priority to Chinese Patent Application No. 201811506468.2, filed on Dec. 10, 2018, the entirety contents of which are incorporated herein by reference.

FIELD

Embodiments of the present disclosure mainly relate to a field of artificial intelligence, and more particularly to a method and an apparatus for responding to a question, and a computer readable storage medium.

BACKGROUND

With development of the information age, lots of users may upload their own messages or comments to a specific object over the Internet. On one hand, these messages or comments enrich content of the Internet; on the other hand, these messages and comments may objectively help other users to further understand quality and characteristics of a message and a comment target. In a scenario such as electronic commerce, a user may also ask his or her own question for a specific object and expect to obtain an accurate answer for the question quickly. Therefore, how to accurately respond to the questions raised by users has become a hot topic of concern.

SUMMARY

According to exemplary embodiments of the present disclosure, a method for responding to a question is provided.

In embodiments of the present disclosure, there is provided a method for responding to a question. The method includes determining a question characteristic representation corresponding to a question for an object; determining a comment characteristic representation corresponding to a first comment for the object; generating a first target characteristic representation by utilizing the question characteristic representation and the comment characteristic representation; and determining an answer for the question based on the first target characteristic representation.

In embodiments of the present disclosure, there is provided an apparatus for responding to a question. The apparatus includes: a question characteristic representation determining module, a comment characteristic representation determining module, a target characteristic representation determining module and an answer determining module. The question characteristic representation determining module is configured to determine a question characteristic representation corresponding to a question for an object. The comment characteristic representation determining module is configured to determine a comment characteristic representation corresponding to a first comment for the object. The target characteristic representation determining module is configured to generate a first target characteristic representation by utilizing the question characteristic representation and the comment characteristic representation. The answer determining module is configured to determine an answer for the question based on the first target characteristic representation.

In embodiments of the present disclosure, there is provided a computer readable storage medium having computer programs stored thereon. When the computer programs are executed by a processor, a method for responding to a question according to embodiments of the present disclosure is implemented. The method includes: determining a question characteristic representation corresponding to a question for an object; determining a comment characteristic representation corresponding to a first comment for the object; generating a first target characteristic representation by utilizing the question characteristic representation and the comment characteristic representation; and determining an answer for the question based on the first target characteristic representation.

It should be understood that, descriptions in Summary of the present disclosure are not intended to limit an essential or important feature in embodiments of the present disclosure, and are also not construed to limit the scope of the present disclosure. Other features of the present disclosure will be easily understood by following descriptions.

BRIEF DESCRIPTION OF THE DRAWINGS

The above and other features, advantages and aspects of respective embodiments of the present disclosure will become more apparent with reference to accompanying drawings and following detailed illustrations. In the accompanying drawings, the same or similar numeral references represent the same or similar elements, in which.

DETAILED DESCRIPTION

Description will be made in detail below to embodiments of the present disclosure with reference to accompanying drawings. Some implementations of embodiments of the present disclosure are illustrated in the accompanying drawings. It should be understood that, the present disclosure may be implemented in various ways, and is not limited to the embodiments described herein. On the contrary, those embodiments provided are merely for a more thorough and complete understanding of the present disclosure. It should be understood that, the accompanying drawings and embodiments of the present disclosure are merely for exemplary purposes, and is not used to limit the protection scope of the present disclosure.

In the description of embodiments of the present disclosure, terms such as "include" and its equivalents should be understood as an inclusive meaning, i.e. "include but not limited to". Terms such as "based on" should be understood as "at least partially based on". Terms such as "an embodiment" or "the embodiment" should be understood as "at least one embodiment". Terms such as "first", "second" and the like may represent different or same objects. Other explicit and implicit definitions may also be included below.

As discussed above, a user may usually ask his/her own question for a specific object over the Internet, and expect to obtain an accurate answer quickly for the question. There have been solutions for answering user's question through intelligent question and answer robots. However, such questions should be in a single scenario, where such questions intelligently are responded merely on a particular dimension. For example, some robots for intelligent shopping may merely respond to a specific dimension of a product (such as, size information, logistics information, price information, etc.). Such intelligent question and answer robots are merely based on a specific rule, so it is difficult to cover other dimensions that are not covered by the rule.

According to embodiments of the present disclosure, a method for responding to a question is provided. In the method, a question for a specific object is converted to a question characteristic representation corresponding to the question, and a comment for the specific object is also converted to a comment characteristic representation corresponding to the comment. Further, a target characteristic representation is generated based on the question characteristic representation and the comment characteristic representation, and an answer for the question is determined based on the target characteristic representation. The solution of the present disclosure may integrate questions and comments together for consideration when a response is made for the question, thus improving accuracy for responding to a question.

Figure 1:
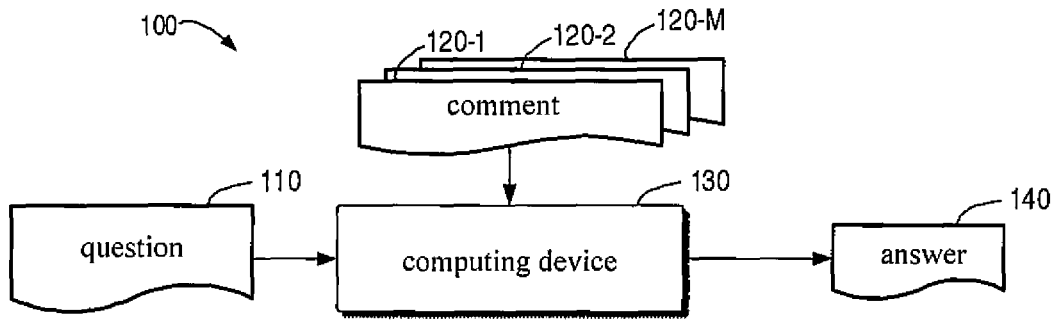
FIG. 1 is a schematic diagram illustrating an exemplary scene in which a plurality of embodiments of the present disclosure may be implemented.

Embodiments of the present disclosure are described in detail below with reference to the accompanying drawings. FIG. 1 is a schematic diagram illustrating an exemplary scene 100 in which a plurality of embodiments of the present disclosure may be implemented. In the exemplary scene 100, a computing device 130 may receive a question 110 for an object. In some embodiments, the object may be any suitable type. In some embodiments, the question 110 is a binary classification question for the object, that is, the answer is "yes" or "no". For example, in FIG. 1, an exemplary question 110 may be a question for a dress, which is "Can this dress be worn by a little girl?", and the answer is usually "yes" or "no".

In some embodiments, the question 110 may be sent the computing device 130 in a wire communication way or in a wireless communication way. In some embodiments, the computing device 130 may also receive the question 110 inputted by the user via an input device coupled to the computing device 130.

As illustrated in FIG. 1, the computing device 130 may also receive one or more comments such as comments 120-1, 120-2, . . . , 120-M for the object. For describing conveniently, the plurality of comments 120-1, 120-2, . . . , 120-M may be collectively referred as comment 120. In some embodiments, the computing device 130 may obtain the comment 120 for the object from a comment database locating in the computing device 130 or a comment database locating outside the computing device 130. In some embodiments, the computing device 130 may also extract the comment 120 for the object automatically from a product page associated with the object. For example, an exemplary comment 120-1 illustrated in FIG. 1 may be "My 3 years old girl loved it".

The computing device 130 may determine an answer 140 for the question 110 based on the received question 110 and the received comment 120. For example, in the example of FIG. 1, the computing device 130 may determine that the answer 140 for the question 110 "Can this dress be worn by a little girl?" is "yes" by utilizing the method for responding to a question of the present disclosure and based on characteristic representations of the question 110 and the comment 120. It should be understood that, the illustrated question, the illustrated comment and the illustrated answer are merely an example, and the question and the corresponding comment may be changed based on an actual condition, which are not limited by the scope of the present disclosure.

Figure 2:
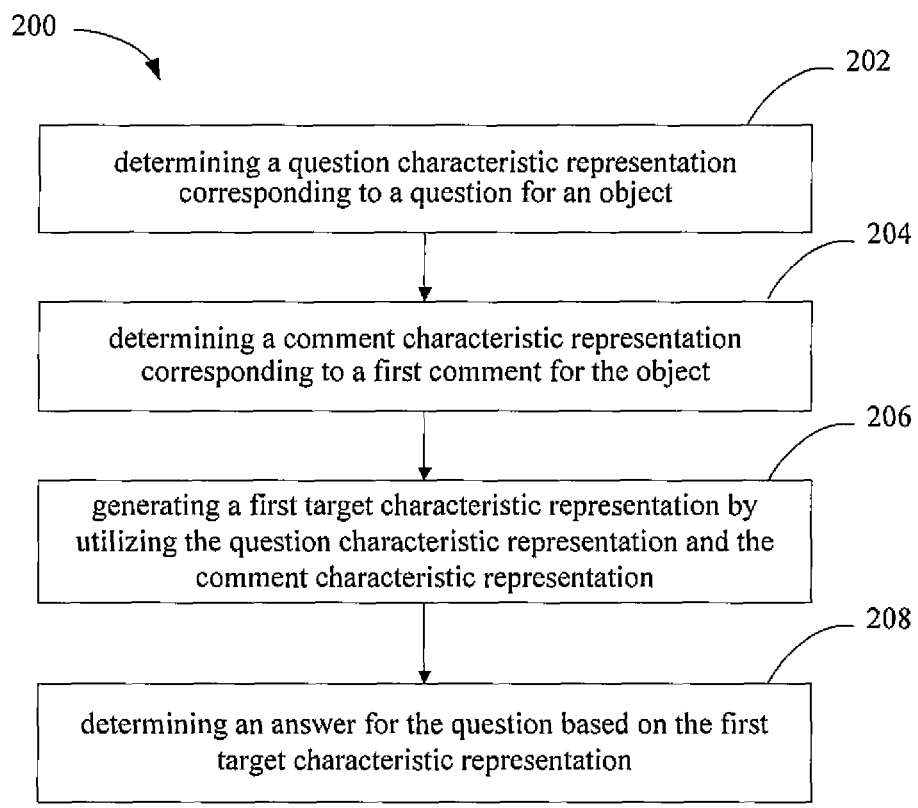
FIG. 2 is a flow chart illustrating a procedure for responding to a question according to embodiments of the present disclosure.
Figure 3:
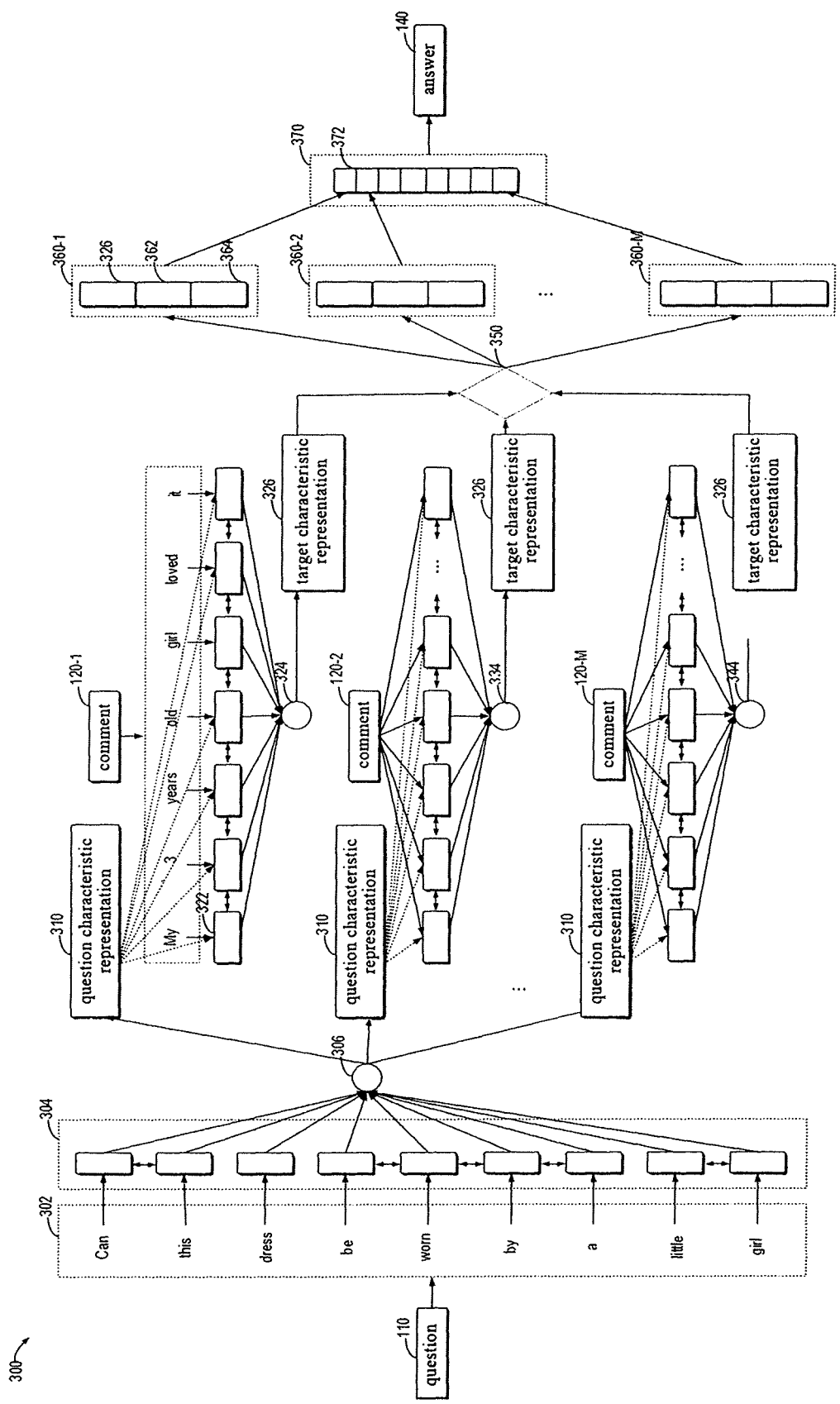
FIG. 3 is a schematic diagram illustrating a system for responding to a question according to embodiments of the present disclosure.

A procedure for responding to a question will be described in more detail below with reference to FIG. 2 and FIG. 3. FIG. 2 is a flow chart illustrating a procedure 200 for responding to a question according to some embodiments of the present disclosure, and FIG. 3 is a schematic diagram illustrating a system 300 for determining an answer for a question according to embodiments of the present disclosure. The procedure 200 may be implemented by the computing device 130 illustrated in FIG. 1. For describing conveniently, the procedure 200 will be described with reference to FIG. 1 and FIG. 3.

At block 202, the computing device 130 determines a question characteristic representation corresponding to a question 110 for an object. In detail, the computing device 130 may perform a segmentation on the question 110 to determine a first vocabulary characteristic representation. As illustrated in FIG. 3, when the question 110 is received, the computing device 130 may perform the segmentation on the received question 110 by utilizing a segmentation model. When the question is pinyin characters such as English or Latin, a segmented result is respective segmented words; when the question is Chinese or Japanese, a segmented result is respective segmented vocabularies. In detail, in an example illustrated in FIG. 3, a segmented result of the question 110, i.e., the obtained segments may be "can", "this", "dress", "be", "worn", "by", "a", "little", and "girl". It should be understood that, any suitable segmentation technology may be employed to perform the segmentation on the question 110, which is not elaborated herein.

It is assumed that a question includes n English words (or n Chinese words). When an English word (or a Chinese word) at the $i^{-th}$ index position is defined as $v_i$, the question with the length is n may be represented as $v_{1:n}=[v_1, v_2, \ldots, v_n]$. In some embodiments, the computing device 130 may define a number corresponding to each English word $v_i$. In detail, for example, the number is a vector with a dimension d, i.e., $v_i \in \mathfrak{R}^d$. For example, in an example of FIG. 3, a first vocabulary characteristic representation 302 of the question 110 may be represented as $[v_1^q, v_2^q, \ldots, v_n^q]$, where $v_i^q$ represents the $i^{-th}$ word in a question q file.

In some embodiments, the computing device 130 may determine a question characteristic representation 310 based on the first vocabulary characteristic representation 302. In some embodiments, the computing device 130 may use the first vocabulary characteristic representation 302 as the question characteristic representation 310 directly.

In some embodiments, the computing device 130 may apply the first vocabulary characteristic representation 302 to a context extraction model, to obtain the question characteristic representation. The context extraction model is configured to determine a context relationship among elements in the first vocabulary characteristic representation. For example, the computing device 130 may extract context information of the question 110 by utilizing a Bi-directional long and short term memory network (Bi-LSTM). For example, a coding characteristic representation 304 after being coded by a Bi-LSTM model may be represented as:

$$u_{1:n}^q = [u_1^q, u_2^q, \ldots, u_n^q] = \text{BILSTM} ([v_1^q, v_2^q, \ldots, v_n^q]) \quad (1)$$

where $v_{1:n}^q = [v_1^q, v_2^q, \ldots, v_n^q]$ represents the question 110 of which the length is n. In an example of FIG. 3, n=7, and $u_{1:n}^q = [u_1^q, u_2^q, \ldots, u_n^q]$ is a representation of $v_{1:n}^q$ after being coded by the Bi-LSTM model. $v_i^q \in \Re^d$, and d represents a dimension of a word vector. $u_i^q \in \Re^{2h}$, and h represents a number of neurons in a hidden layer of the Bi-LSTM. In some embodiments, the computing device 130 may use the coding characteristic representation 304 as the question characteristic representation 310. By introducing the context information extracted by the Bi-LSTM, the question characteristic representation 310 may better represent a logicality among respective vocabularies in the question 110.

In some embodiment, the computing device 130 may also combine $u_{1:n}^q$ into a coding vector with a specific dimension. As illustrated in FIG. 3, the computing device 130 may calculate a weight $\alpha_i$ associated with the $i^{-th}$ element $u_i^q$ in the coding characteristic representation by utilizing a weight model 306 (for describing conveniently, referred as a first weight system below) and based on information of the coding characteristic representation 304, in which, $$\alpha_i = \text{softmax}(r^T \tan h(w_a u_i^q)) \quad (2)$$

where the softmax function may ensure that a sum of elements in the weight vector $\alpha$ is 1, r and $w_\alpha$ may be adjusted by model training, which will be taken as a part of training parameters of the entire system 300 for training uniformly, and a detailed training procedure will be described in detail below. In some embodiments, the computing device 130 may perform a weighted summation on $u_i^q$ by utilizing $\alpha_i$ respectively, to obtain a characteristic representation $\chi^q$ as the question characteristic representation 310, in which, $$\chi^q = \sum_{i=1}^{n} \alpha_i u_i^q. \quad (3)$$

In embodiments of the present disclosure, respective elements in the coding characteristic representation 304 are weighted by utilizing the weight model 306 to obtain the question characteristic representation 310. The question characteristic representation 310 may better reflect the importance of each vocabulary in the question 110 and reduce the extent to which certain irrelevant vocabularies affect the model.

Referring to FIG. 2 again, at block 204, the computing device 130 determines a comment characteristic representation corresponding to a comment 120 for the object. In some embodiments, the computing device 130 may receive the question 110 for the object firstly, and obtain the comment 120 associated with the object. For example, in the example of FIG. 1, the question 110 is a question for a product object "dress", and the computing device 130 may obtain the comment 120 associated with the product object "dress" from a default comment database. Alternatively, the computing device 130 may also extract the associated comment 120 from a network webpage of the product object "dress".

In some embodiments, the computing device 130 may filter out some comment with low quality by the model. For example, the computing device 130 may filter out junk comments that may be sent by a robot account, thus avoiding interference of junk comments on the answer.

A comment 120-1 "My 3 years old girl loved it." will be taken as an example to describe the procedure at block 204 below. In detail, as illustrated in FIG. 3, the computing device 130 may perform the segmentation on the comment 120-1, to determine a second vocabulary characteristic representation. As illustrated in FIG. 3, after the comment 120-1 is obtained, the computing device 130 may perform the segmentation on the comment 120-1 by utilizing a segmentation model. Similar to the procedure for performing the segmentation on the question above, when the comment is a pinyin such as English or Latin, a segmented result may be respective segmented words; and when the comment is Chinese or Japanese, a segmented result may be respective segmented vocabularies. In detail, in the example illustrated in FIG. 3, a segmented result of the comment 120-1 is: "my", "3", "years", "old", "girl", "loved", and "it". It should be understood that, any suitable segmentation technology may be employed to perform the segmentation on the comment 120-1, which is not elaborated herein.

Continuing to the example of FIG. 3, based on coding each word in the comment 120-1, the second vocabulary characteristic representation of the comment 120-1 may be represented as $[v_1^{rj}, v_2^{rj}, \ldots, v_n^{rj}]$, where $v_i^{rj}$ is the $i^{-th}$ word in the $j^{-th}$ comment. In some embodiments, the computing device 130 may take the second vocabulary characteristic representation as the comment characteristic representation directly.

Referring to FIG. 2 again, at block 206, the computing device 130 generates a target characteristic representation by utilizing the question characteristic representation and the comment characteristic representation. In some embodiments, the computing device 130 may combine each element in the second vocabulary characteristic representation and the question characteristic representation to obtain a combination characteristic representation. In detail, as illustrated in FIG. 3, the computing device 130 may combine $\chi$ which represents the question characteristic representation 310 with each element 322 (coded on a word) of the comment characteristic representation of the comment 120-1 to obtain a combination characteristic representation e. The combination characteristic representation e may be represented as $e_i^{rj} = v_i^{rj} \oplus \chi$. Therefore, the combination characteristic representation may be represented as $$e_{1:n}^{rj} = [e_1^{rj}, e_2^{rj}, \ldots, e_n^{rj}] = [v_1^{rj}, \chi, v_2^{rj}, \chi, \ldots, v_n^{rj}, \chi]$$
$$(e_i^{rj} \in \Re^{d+2 \times h}) \quad (4)$$

With such characteristic combination way, the solution of the present disclosure may not only consider an input question and related comments at the same time, but also solve a disadvantage that the existing solution is difficult to extract an effective feature from a short text, thereby improving the accuracy for responding a question.

In some embodiments, the computing device 130 may determine a target characteristic representation 326 based on the combination characteristic representation. In some embodiments, the computing device 130 may take the combination characteristic representation as the target characteristic representation directly.

In some embodiments, the computing device 130 may apply the combination characteristic representation to a context extraction model, to obtain the target characteristic representation, and the context extraction model is configured to determine a context relationship among elements in the combination characteristic representation. For example, as illustrated in FIG. 3, the computing device 130 may extract context information in the comment characteristic representation by utilizing the Bi-LSTM. A coding characteristic representation $\bar{e}_{1:n}^{rj}$ after being coded by the Bi-LSTM may be represented as:

$$\bar{e}_{1:n}^{rj}=[\bar{e}_1^{rj},\bar{e}_2^{rj},\ldots,\bar{e}_n^{rj}]=\text{BILSTM}([e_1^{rj},e_2^{rj},\ldots,e_n^{rj}]) \quad (5)$$

In some embodiments, the computing device 130 may take the coding characteristic representation $\bar{e}_{1:n}^{rj}$ as the target characteristic representation. By introducing context information extracted by the Bi-LSTM, the target characteristic representation may better reflect context information of respective vocabularies in the question 110 and in the comment 120-1.

In some embodiments, the computing device 130 may also determine a weight associated with each element in the combination characteristic representation by utilizing a weight model 324, and weight each element by utilizing the weight, to obtain the target characteristic representation 326. For example, a weighted target characteristic representation $z^{rj}$ associated with the $j^{-th}$ comment may be represented as $$z^{rj} = \sum_{i=1}^{n} \text{softmax}(\theta^T \tanh(w_\beta \bar{e}_i^{rj}))\bar{e}_i^{rj} \quad (6)$$

where $\theta$ and $w_\beta$ are adjustable parameters by training, which may be taken as a part of the training parameters of the entire system 300 for training uniformly. The detailed training procedure will be described in detail below.

The generation procedure of the target characteristic representation 326 is described by utilizing only the comment 120-1 as an example. Similarly, the computing device 130 may generate a target characteristic representation 336 associated with a second comment 120-2 and a target characteristic representation 346 associated with the $M^{th}$ comment 120-M based on the question characteristic representation 310, the comment 120-2 and the comment 120-M.

Figure 4:
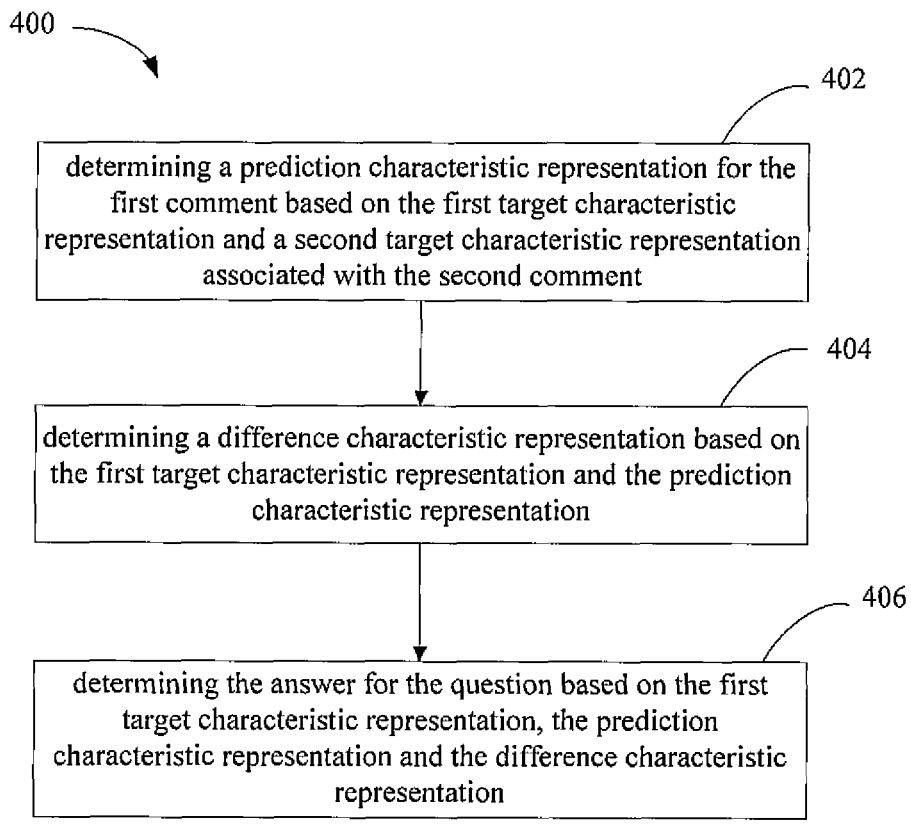
FIG. 4 is a flow chart illustrating a procedure for determining an answer for a question according to embodiments of the present disclosure.

Referring to FIG. 2 again, at block 208, the computing device 130 determines an answer for the question based on the target characteristic representation. The detailed operation procedure of block 208 will be described below with reference to FIG. 4. FIG. 4 is a flow chart illustrating a procedure 400 for determining an answer for a question according to embodiments of the present disclosure.

At block 402, the computing device 130 determines a prediction characteristic representation for the first comment based on the first target characteristic representation and a second target characteristic representation associated with the second comment. In detail, the computing device 130 may extract support information of each piece of comment for other comments by a cross-voting inspection mechanism. The support information $s_{i,j}$ may be represented as:

$$s_{i,j} = \begin{cases} -\infty, & i = j \\ z'^{iT} \cdot z^{rj}, & i \neq j \end{cases} \quad (7)$$

According to $s_{i,j}$, the computing device may calculate a contribution weight $\beta_{i,j}$ (i.e., $\beta_{i,j}=\exp(s_{i,j})/\Sigma_{k=1}^{n}s_{i,k}$) of other comments for the target comment. Further, the computing device 130 may perform the weighted summation on $z^{rj}$ by utilizing $\beta$, to obtain a prediction characteristic representation $\tilde{z}^{rj}$ (i.e., $\tilde{z}^{rj}=\Sigma_{i=1}^{n}\beta_{i,j} \cdot z^{ri}$) of the $j^{-th}$ comment. In detail, for the first comment 120-1, the computing device 130 may calculate support information $s_{2,1}=z^{r1T} \cdot z^{r2}$ of the second comment 120-2 for the first comment 120-1 based on a first target characteristic representation 326 $z^{r1}$ and a second target characteristic representation 336 $z^{r2}$. Correspondingly, a prediction characteristic representation 362 of the first comment 120-1 may be represented as:

$$\tilde{z}^{r1}=\Sigma_{i=1}^{n}\beta_{i,1} \cdot z^{ri} \quad (8)$$

At block 404, the computing device 130 determines a difference characteristic representation based on the first target characteristic representation and the prediction characteristic representation. Continuing to the example of FIG. 3, the computing device 130 may perform not exclusive or operation on the first target characteristic representation 326 and the prediction characteristic representation 362, that is, the difference characteristic representation 364 may be represented as $z^{rj} \odot \tilde{z}^{rj}$.

At block 406, the computing device 130 determines the answer 140 for the question based on the first target characteristic representation, the prediction characteristic representation and the difference characteristic representation. As illustrated in FIG. 3, the computing device 130 may determine a characteristic representation 360-1 associated with the first comment 120-1, which may include three parts: the target characteristic representation 326, the prediction characteristic representation 362 and the difference characteristic representation 364. For example, the characteristic representation 360 (360-1, 360-2 . . . 360-M) may be represented as $g^{rj}=[z^{rj}, \tilde{z}^{rj}, z^{rj} \odot \tilde{z}^{rj}]$. In some embodiments, the computing device 130 may determine the answer 140 for the question 110 based on a plurality of characteristic representations 360 and by utilizing a logistic regression model. Based on the same way, the technical solution of the present disclosure not only considers the characteristic of the comment, but also considers the support information of other comments for the comment, thus improving the accuracy for predicting a question.

In some embodiments, the computing device 130 may select at least one characteristic from the first target characteristic representation, the prediction characteristic representation and the difference characteristic representation. For example, for accelerating to train a model, the computing device 130 may utilize maxing pooling to select the most efficient one from each characteristic representation 360. By performing the maxing pooling on a plurality of characteristic representations 360, the computing device 130 may obtain a maxing pooling characteristic representation 370, which may be represented as $$x=\text{max-pooling}[g^{r1},g^{r2},\ldots,g^{rm}] \quad (9),$$

where $x \in \Re^m$. In detail, as illustrated in FIG. 3, the characteristic 372 may be obtained by performing the maxing pooling on the characteristic representation 360-1. Based on such way, the technical solution of the present disclosure may reduce the dimension of the training vector and accelerate the training for the model while ensuring quality.

In some embodiments, the computing device 130 may determine an answer by utilizing the logistic regressive model based on the at least one characteristic. In detail, as illustrated in FIG. 3, the computing device 130 may perform processing on the maxing pooling characteristic representation 370 by utilizing the logistic regression model, to obtain the answer 140 of the question 110. For example, the prediction answer 140 may be represented as $$\hat{y} = \frac{1}{1+\exp-\left(w_y^T x + b_y\right)}, \quad (10)$$

where ŷ represents a prediction answer of the apparatus for the question, and $w_y$ and $b_y$ are a parameter and an offset of the logistic regression model respectively.

The using procedure of the system 300 is described above. In the training procedure, for training data with N samples, the computing device 130 may correspondingly predict a series of answer probabilities $(\hat{y}_1, \hat{y}_2, \ldots, \hat{y}_n)$. Comparing with an actual value, a loss in the prediction procedure may be marked as $$L_y = \sum_{i=1}^{N} (y_i - 1)\log(1 - \hat{y}_i) - y_i \log(\hat{y}_i). \quad (11)$$

In the training procedure, the computing device 130 may first randomly initialize the following parameter spaces: a parameter group in the Bi-LSTM model, r, $w_\alpha$, θ and $w_\beta$ in the weight model, and a parameter $w_y$ and an offset $b_y$ of a learning target. Next, the computing device 130 may send a plurality of pieces of training data into the system 300 one by one or in batches. The input may be a question and comments corresponding to the question. A receiving end may respond the question truly, which may be represented as (0/1). In detail, the computing device 130 may employ a stochastic gradient descent algorithm to backtrack and to update the parameters layer by layer, so as to gradually reduce the loss $L_y$, which may be until the loss has been reduced to an acceptable level, or the number of iterations has exceeded the preset number of times.

Figure 5:
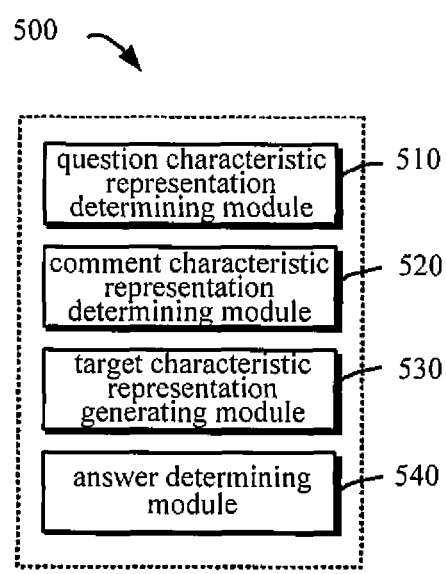
FIG. 5 is a block diagram illustrating an apparatus for responding to a question according to embodiments of the present disclosure.

FIG. 5 is a block diagram illustrating an apparatus 500 for responding to a question according to embodiments of the present disclosure. The apparatus 500 may be included in the computing device 130 illustrated in FIG. 1, or implemented as the computing device 130. As illustrated in FIG. 5, the apparatus 500 includes a question characteristic representation determining module 510, configured to determine a question characteristic representation corresponding to a question for an object. The apparatus 500 further includes a comment characteristic representation determining module 520, configured to determine a comment characteristic representation corresponding to a first comment for the object. The apparatus 500 further includes a target characteristic representation generating module, configured to generate a first target characteristic representation by utilizing the question characteristic representation and the comment characteristic representation. In addition, the apparatus 500 further includes an answer determining module 540, configured to determine an answer for the question based on the first target characteristic representation.

In some embodiments, the apparatus 500 further includes: a comment obtaining module, configured to obtain the first comment associated with the object in response to receiving the question for the object.

In some embodiments, the question characteristic representation determining module 510 includes: a first vocabulary characteristic representation determining module and a first question characteristic representation determining module. The first vocabulary characteristic representation determining module is configured to determine a first vocabulary characteristic representation by performing a segmentation on the question. The first question characteristic representation determining module is configured to determine the question characteristic representation based on the first vocabulary characteristic representation.

In some embodiments, the first question characteristic representation determining module includes a first applying module, configured to apply the first vocabulary characteristic representation to a context extraction model, to obtain the question characteristic representation. The context extraction model is configured to determine a context relationship among elements in the first vocabulary characteristic representation.

In some embodiments, the comment characteristic representation determining module 520 includes: a second vocabulary characteristic representation determining module and a first comment characteristic representation determining module. The second vocabulary characteristic representation determining module is configured to determine a second vocabulary characteristic representation by performing a segmentation on the comment. The first comment characteristic representation determining module is configured to determine the comment characteristic representation based on the second vocabulary characteristic representation.

In some embodiments, the target characteristic representation determining module 530 includes: a combination determining module and a first target characteristic representation determining module. The combination module is configured to combine each element in the second vocabulary characteristic representation with the question characteristic representation, to obtain a combination characteristic representation. The first target characteristic representation determining module is configured to determine the first target characteristic representation based on the combination characteristic representation.

In some embodiments, the first target characteristic representation determining module includes: a second applying module, configured to apply the combination characteristic representation to a context extraction model, to obtain the first target characteristic representation. The context extraction model is configured to determine a context relationship among elements in the combination characteristic representation.

In some embodiments, the first target characteristic representation determining module includes: a weight determining module and a weighting module. The weight determining module is configured to determine a weight associated with each element in the combination characteristic representation by utilizing a weight model. The weighting module is configured to weight the element by utilizing the weight, to obtain the first target characteristic representation.

In some embodiments, the comment is a first comment, and the target characteristic representation is the first target characteristic representation. The apparatus 500 further includes: a second comment obtaining module, configured to obtain a second comment for the object. The answer determining module 540 includes: a prediction characteristic representation determining module, a difference characteristic representation determining module and a first answer determining module. The prediction characteristic representation determining module is configured to determine a prediction characteristic representation for the first comment based on the first target characteristic representation and a second target characteristic representation associated with the second comment. The difference characteristic representation determining module is configured to determine a difference characteristic representation based on the first target characteristic representation and the prediction characteristic representation. The first answer determining module is configured to determine the answer for the question based on the first target characteristic representation, the prediction characteristic representation and the difference characteristic representation.

In some embodiments, the first answer determining module includes: a characteristic selection determining module and a second answer determining module. The characteristic selection determining module is configured to select at least one characteristic representation of the first target characteristic representation, the prediction characteristic representation and the difference characteristic representation. The second answer determining module is configured to determine the answer by utilizing a regression model based on the at least one characteristic representation.

Figure 6:
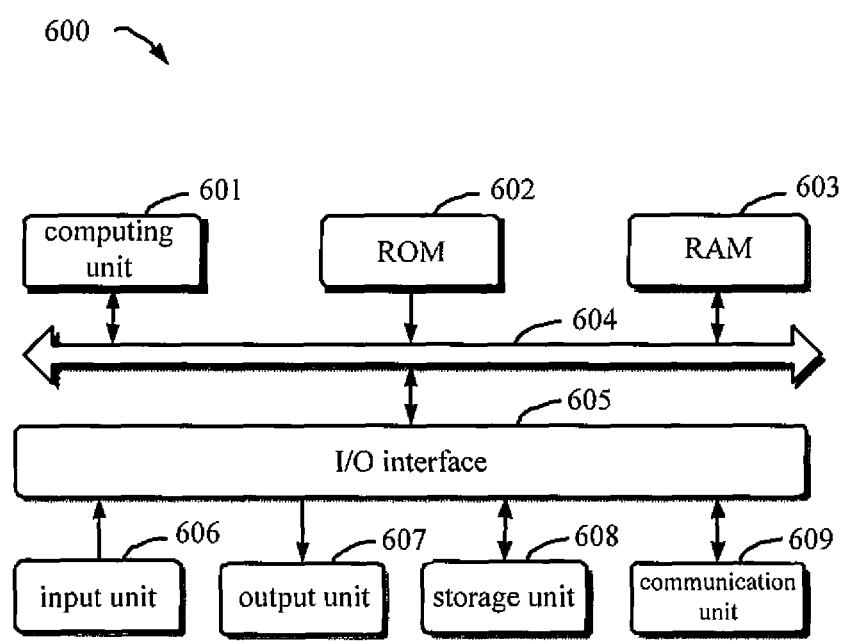
FIG. 6 is a block diagram illustrating a computing device being capable of implementing a plurality of embodiments of the present disclosure.

FIG. 6 is a block diagram illustrating an exemplary device 600 for implementing embodiments of the present disclosure. The device 600 may be configured as the computing device 130 illustrated in FIG. 1. As illustrated in FIG. 6, the device 600 includes a center processing unit (CPU) 601. The CPU 601 may execute various appropriate actions and processes according to computer program instructions stored in a read only memory (ROM) 602 or computer program instructions loaded to a random access memory (RAM) 603 from a storage unit 608. The RAM 603 may also store various programs and date required by the device 600. The CPU 601, the ROM 602, and the RAM 603 may be connected to each other via a bus 604. An input/output (I/O) interface 605 is also connected to the bus 604.

A plurality of components in the device 600 are connected to the I/O interface 605, including: an input unit 606 such as a keyboard, a mouse; an output unit 607 such as various types of displays, loudspeakers; a storage unit 608 such as a magnetic disk, an optical disk; and a communication unit 609, such as a network card, a modem, a wireless communication transceiver. The communication unit 609 allows the device 600 to exchange information/data with other devices over a computer network such as the Internet and/or various telecommunication networks.

The processing unit 601 executes the above-mentioned methods and processes, such as the method 300. For example, in some embodiments, the procedure 200 and/or the procedure 400 may be implemented as a computer software program. The computer software program is tangibly contained a machine readable medium, such as the storage unit 608. In some embodiments, a part or all of the computer programs of the computer programs may be loaded and/or installed on the device 600 through the ROM 602 and/or the communication unit 609. When the computer programs are loaded to the RAM 603 and are executed by the CPU 601, one or more blocks of the procedure 200 and/or the procedure 400 described above may be executed. Alternatively, in other embodiments, the CPU 601 may be configured to execute the procedure 200 and/or the procedure 400 in other appropriate ways (such as, by means of hardware).

The functions described herein may be executed at least partially by one or more hardware logic components. For example, without not limitation, exemplary types of hardware logic components that may be used include: a field programmable gate array (FPGA), an application specific integrated circuit (ASIC), an application specific standard product (ASSP), a system on chip (SOC), a complex programmable logic device (CPLD) and the like.

Program codes for implementing the method of the present disclosure may be written in any combination of one or more programming languages. These program codes may be provided to a processor or a controller of a general purpose computer, a special purpose computer or other programmable data processing device, such that the functions/operations specified in the flowcharts and/or the block diagrams are implemented when these program codes are executed by the processor or the controller. These program codes may execute entirely on a machine, partly on a machine, partially on the machine as a stand-alone software package and partially on a remote machine or entirely on a remote machine or entirely on a server.

In the context of the present disclosure, the machine-readable medium may be a tangible medium that may contain or store a program to be used by or in connection with an instruction execution system, apparatus, or device. The machine-readable medium may be a machine-readable signal medium or a machine-readable storage medium. The machine-readable medium may include, but not limit to, an electronic, magnetic, optical, electromagnetic, infrared, or semiconductor system, apparatus, or device, or any suitable combination of the foregoing. More specific examples of the machine-readable storage medium may include electrical connections based on one or more wires, a portable computer disk, a hard disk, a RAM, a ROM, an erasable programmable read-only memory (EPROM or flash memory), an optical fiber, a portable compact disk read-only memory (CD-ROM), an optical storage, a magnetic storage device, or any suitable combination of the foregoing.

In addition, although the operations are depicted in a particular order, it should be understood to require that such operations are executed in the particular order illustrated in the drawings or in a sequential order, or that all illustrated operations should be executed to achieve the desired result. Multitasking and parallel processing may be advantageous in certain circumstances. Likewise, although several specific embodiment details are included in the above discussion, these should not be construed as limitation of the scope of the present disclosure. Certain features described in the context of separate embodiments may also be implemented in combination in a single implementation. On the contrary, various features described in the context of the single implementation may also be implemented in a plurality of implementations, either individually or in any suitable sub-combination.

Although the subject matter has been described in language specific to structural features and/or methodological acts, it should be understood that the subject matter defined in the appended claims is not limited to the specific features or acts described above. Instead, the specific features and acts described above are merely exemplary forms of implementing the claims.

What is claimed is:

1. A method for responding to a question for an object, comprising:
    determining a question characteristic representation corresponding to the question for the object;
    determining a comment characteristic representation corresponding to a first comment for the object;
    generating a first target characteristic representation by utilizing the question characteristic representation and the comment characteristic representation; and
    determining an answer for the question based on the first target characteristic representation.

2. The method of claim 1, further comprising:
    obtaining the first comment associated with the object in response to receiving the question for the object.

3. The method of claim 1, wherein, determining the question characteristic representation comprises:
- determining a first vocabulary characteristic representation by performing a segmentation on the question; and
- determining the question characteristic representation based on the first vocabulary characteristic representation.

4. The method of claim 3, wherein, determining the question characteristic representation based on the first vocabulary characteristic representation comprises:
- applying the first vocabulary characteristic representation to a context extraction model, to obtain the question characteristic representation, the context extraction model being configured to determine a context relationship among elements in the first vocabulary characteristic representation.

5. The method of claim 1, wherein, determining the comment characteristic representation comprises:
- determining a second vocabulary characteristic representation by performing a segmentation on the first comment; and
- determining the comment characteristic representation based on the second vocabulary characteristic representation.

6. The method of claim 5, wherein, generating the first target characteristic representation comprises:
- combining each element in the second vocabulary characteristic representation with the question characteristic representation, to obtain a combination characteristic representation; and
- determining the first target characteristic representation based on the combination characteristic representation.

7. The method of claim 6, wherein, determining the first target characteristic representation based on the combination characteristic representation comprises:
- applying the combination characteristic representation to a context extraction model, to obtain the first target characteristic representation, in which, the context extraction model is configured to determine a context relationship among elements in the combination characteristic representation.

8. The method of claim 6, wherein, determining the first target characteristic representation based on the combination characteristic representation comprises:
- determining a weight associated with an element in the combination characteristic representation by utilizing a weight model; and
- weighting the element in the combination characteristic representation by utilizing the weight.

9. The method of claim 1, further comprising: obtaining a second comment for the object;
- wherein determining the answer for the question comprises:
  - determining a prediction characteristic representation for the first comment based on the first target characteristic representation and a second target characteristic representation associated with the second comment;
  - determining a difference characteristic representation based on the first target characteristic representation and the prediction characteristic representation; and
  - determining the answer for the question based on the first target characteristic representation, the prediction characteristic representation and the difference characteristic representation.

10. The method of claim 9, wherein, determining the answer for the question based on the first target characteristic representation, the prediction characteristic representation and the difference characteristic representation comprises:
- selecting at least one characteristic representation from the first target characteristic representation, the prediction characteristic representation and the difference characteristic representation; and
- determining the answer by utilizing a regression model based on the at least one characteristic representation.

11. An apparatus for responding to a question for an object, comprising:
- one or more processors;
- a memory storing instructions executable by the one or more processors;
- wherein the one or more processors are configured to:
  - determine a question characteristic representation corresponding to the question for the object;
  - determine a comment characteristic representation corresponding to a first comment for the object;
  - generate a first target characteristic representation by utilizing the question characteristic representation and the comment characteristic representation; and
  - determine an answer for the question based on the first target characteristic representation.

12. The apparatus of claim 11, wherein the one or more processors are configured to:
- obtain the first comment associated with the object in response to receiving the question for the object.

13. The apparatus of claim 11, wherein, the one or more processors are configured to determine the question characteristic representation by performing acts of:
- determining a first vocabulary characteristic representation by performing a segmentation on the question; and
- determining the question characteristic representation based on the first vocabulary characteristic representation.

14. The apparatus of claim 12, wherein, the one or more processors are configured to determine the question characteristic representation based on the first vocabulary characteristic representation by performing an act of:
- applying the first vocabulary characteristic representation to a context extraction model, to obtain the question characteristic representation, the context extraction model being configured to determine a context relationship among elements in the first vocabulary characteristic representation.

15. The apparatus of claim 11, wherein, the one or more processors are configured to determine the comment characteristic representation by performing acts of:
- determining a second vocabulary characteristic representation by performing a segmentation on the comment; and
- determining the comment characteristic representation based on the second vocabulary characteristic representation.

16. The apparatus of claim 15, wherein, the one or more processors are configured to generate the first target characteristic representation by performing acts of:
- combining each element in the second vocabulary characteristic representation with the question characteristic representation, to obtain a combination characteristic representation; and
- determining the first target characteristic representation based on the combination characteristic representation.

17. The apparatus of claim 16, wherein, the one or more processors are configured to determine the first target characteristic representation based on the combination characteristic representation by performing an act of:

applying the combination characteristic representation to a context extraction model, to obtain the first target characteristic representation, in which, the context extraction model is configured to determine a context relationship among elements in the combination characteristic representation.

18. The apparatus of claim 16, wherein, the one or more processors are configured to determine the first target characteristic representation based on the combination characteristic representation by performing acts of:

determining a weight associated with an element in the combination characteristic representation by utilizing a weight model; and weighting the element in the combination characteristic representation by utilizing the weight.

19. The apparatus of claim 11, wherein the one or more processors are configured to obtain a second comment for the object;

and the one or more processors are configured to determine the answer for the question by performing acts of:

determining a prediction characteristic representation for the first comment based on the first target characteristic representation and a second target characteristic representation associated with the second comment;

determining a difference characteristic representation based on the first target characteristic representation and the prediction characteristic representation; and determining the answer for the question based on the first target characteristic representation, the prediction characteristic representation and the difference characteristic representation.

20. A non-transitory computer readable storage medium having a computer program stored thereon that, when executed by a processor, causes the processor to implement a method for responding to a question for an object, wherein the method comprises:

determining a question characteristic representation corresponding to the question for the object;

determining a comment characteristic representation corresponding to a first comment for the object;

generating a first target characteristic representation by utilizing the question characteristic representation and the comment characteristic representation; and determining an answer for the question based on the first target characteristic representation.

* * * * *